US007302790B2

(12) United States Patent
Brandon

(10) Patent No.: US 7,302,790 B2
(45) Date of Patent: Dec. 4, 2007

(54) ADJUSTABLE SPINDLE ASSEMBLY FOR A GRASS TRIMMER

(76) Inventor: Dennis Brandon, 300 Freehill Rd., Hendersonville, TN (US) 37075

( * ) Notice: Subject to any disclaimer, the term of this patent is extended or adjusted under 35 U.S.C. 154(b) by 2 days.

(21) Appl. No.: 11/382,348

(22) Filed: May 9, 2006

(65) Prior Publication Data
US 2006/0191143 A1 Aug. 31, 2006

Related U.S. Application Data

(62) Division of application No. 10/666,387, filed on Sep. 18, 2003, now Pat. No. 7,059,106, which is a division of application No. 09/795,645, filed on Feb. 28, 2001, now Pat. No. 6,666,009.

(51) Int. Cl.
A01D 34/00 (2006.01)
(52) U.S. Cl. ............................... 56/12.7
(58) Field of Classification Search ............. 56/12.7, 56/255, 295, 16.7, 17.5; 30/276, 329, 347
See application file for complete search history.

(56) References Cited

U.S. PATENT DOCUMENTS

| | | | | |
|---|---|---|---|---|
| 2,669,826 A | * | 2/1954 | Watrous .................. 56/13.4 |
| 4,274,201 A | * | 6/1981 | Oberg et al. .............. 30/276 |
| 4,419,822 A | * | 12/1983 | Harris ..................... 30/276 |
| 4,427,308 A | * | 1/1984 | Sandberg ................. 384/115 |
| 4,507,034 A | * | 3/1985 | Lew et al. ................ 411/21 |
| 4,702,005 A | * | 10/1987 | Pittinger et al. .......... 30/276 |
| 4,959,904 A | * | 10/1990 | Proulx ..................... 30/276 |
| 5,205,693 A | * | 4/1993 | Fuller et al. .............. 411/354 |
| 5,339,526 A | * | 8/1994 | Everts ..................... 30/276 |
| 5,451,024 A | * | 9/1995 | Lai ......................... 248/406.2 |
| 5,743,019 A | * | 4/1998 | Berfield .................. 30/276 |
| 5,906,051 A | * | 5/1999 | Nannen .................... 30/276 |
| 6,052,974 A | * | 4/2000 | Harb ....................... 56/12.7 |

* cited by examiner

Primary Examiner—Árpád Fábián Kovács
(74) Attorney, Agent, or Firm—W. Edward Ramage; Baker Donelson

(57) ABSTRACT

An adjustable spindle assembly comprising a spindle housing, a keyed spindle shaft rotatably connected to the spindle housing, a mow ball rotatably connected to one end of the keyed spindle shaft, and a string carrier assembly adjustably connected in between the spindle housing and the mow ball. The string carrier assembly includes a pair of string guides and string holders for securing cutting string to the string carrier assembly without the use of tools. In addition, the string carrier assembly may be moved along the spindle shaft between the spindle housing and the mow ball without the use of tools. A pulley may be connected to a second end of the keyed spindle shaft. The mow ball may have a removable wear point.

4 Claims, 10 Drawing Sheets

ADJUSTABLE SPINDLE ASSEMBLY FOR A GRASS TRIMMER

This application is a divisional of U.S. patent application Ser. No. 10/666,387, filed Sep. 18, 2003 now U.S. Pat No. 7,059,106, by Dennis Brandon, which claims benefit of and is a divisional of U.S. patent application Ser. No. 09/795,645, filed Feb. 28, 2001, by Dennis Brandon, which has issued as U.S. Pat. No. 6,666,009, and is entitled to those filing dates for priority. The specifications and drawings of the above applications are incorporated herein by specific reference.

FIELD OF INVENTION

The present invention relates generally to a spindle assembly for a rotary grass trimmer. More particularly, this invention pertains to an adjustable spindle assembly for a rotary grass trimmer that includes a mow ball rotatably connected to a spindle shaft and allows the attachment of cutting strings or filaments without the use of tools.

BACKGROUND OF THE INVENTION

Although spindle assemblies for rotary grass trimmers are known in the art, the current versions have several problems. For example, U.S. Pat. No. 5,313,770, issued to Smothers on May 24, 1994 and entitled "Jam-Proof Rotary Weed Cutter," discloses a push-type grass trimmer having a spool rigidly connected to a drive shaft. The shaft and spool are driven at a high rate of speed by a motor and, when the trimmer is used, the spool comes into contact with the ground a significant amount of time. As a result, the spool rubs against the ground, wears down, and must be replaced. This result is undesirable because replacing the spool costs time and money. As a result, there is a need for a spindle assembly that reduces the amount of wear on the spool when the spool is in use.

Current spindle assembles also require the use of tools to secure the cutting string or filament to the spool and to adjust the cutting height of the string. U.S. Pat. No. 5,862,655, issued to Altamirano et al. on Jan. 26, 1999 and entitled "Adjustable Mowing and Trimming Apparatus," discloses a push-type grass trimmer that includes an adjustable trimmer head that is connected to a spindle head using a threaded fastener, i.e., a bolt and nut. In addition, the cutting string is also connected to the trimmer head using a bolt and nut. U.S. Pat. No. 6,052,974, issued to Harb on Apr. 25, 2000 and entitled "Adjustable Height Head For String Trimmer," also discloses a string trimmer that uses bolts to secure the cutting string to the trimmer head and to secure the adjustable trimmer head in place.

Since bolts are used to secure the trimmer head and cutting string, a separate tool, such as a wrench, must be used to loosen or tighten the bolts in order to adjust the cutting height or to replace the cutting string. The requirement for a separate tool is undesirable because, in some cases, the required tool may not be readily available. Furthermore, the use of a bolt and nut to secure the trimmer head and cutting string increases the amount of time it takes to replace the cutting string or adjust the height of the trimmer head. Thus, there is a need for a spindle assembly that includes a means for adjusting the cutting height of the trimmer head and attaching the string to the trimmer head that does not require the use of a separate tool.

What is needed, then, is a spindle assembly that reduces the amount of wear on the spool and eliminates the need for a separate tool to adjust the cutting height and to replace the cutting string.

SUMMARY OF THE INVENTION

The present invention satisfies the above described need by providing a spindle assembly that includes a spool, or alternatively, a mow ball, that is rotatably connected to a spindle shaft, a string assembly that is adjustably connected to the spindle shaft between a spindle housing and the mow ball, and wherein the string assembly includes a pair of string guides and string holders for securing cutting string to the string assembly without a separate tool.

In one embodiment, the present invention includes a spindle housing, a spindle shaft rotatably connected to the spindle housing, a pulley connected to one end of the spindle shaft, a mow ball rotatably connected to the opposite end of the spindle shaft, and a string carrier plate having a pair of string guides and s-shaped string holders connected between the spindle housing and the mow ball.

In a second embodiment, the spindle assembly of the present invention includes a spindle housing, a grooved spindle shaft rotatably connected to the spindle housing, a pulley connected to one end of the grooved spindle shaft, a mow ball rotatably connected to the opposite end of the grooved spindle shaft, and a string carrier assembly adjustably connected to the grooved spindle shaft between the spindle housing and the mow ball. The grooved spindle shaft includes a series of locking grooves and the string carrier assembly includes a locking slide and a spring, which can be used in conjunction with the locking grooves to secure the string carrier assembly at various positions between the spindle housing and the mow ball without using a separate tool. The string carrier assembly includes a string carrier plate that includes a pair of string guides and s-shaped string holders that may be used to secure cutting string to the string carrier plate without using a separate tool.

In a third embodiment, the spindle assembly of the present invention includes a spindle housing, a keyed spindle shaft rotatably connected to the spindle housing, a pulley connected to one end of the keyed spindle shaft, a mow ball rotatably connected to the opposite end of the keyed spindle shaft, an exteriorly threaded height adjustment tube connected to the mow ball, and a string cutting assembly adjustably connected to the height adjustment tube between the spindle housing and the mow ball using a locking plate. The string cutting assembly includes a threaded opening for receiving the threaded portion of the height adjustment tube and can be adjusted by releasing the locking plate, rotating the string cutting assembly with respect to the height adjustment tube clockwise or counterclockwise, and engaging the locking plate. The string cutting assembly includes a pair of v-shaped string holders for securing cutting string to the string cutting assembly without using a separate tool.

DETAILED DESCRIPTION OF THE INVENTION

Figure 1:
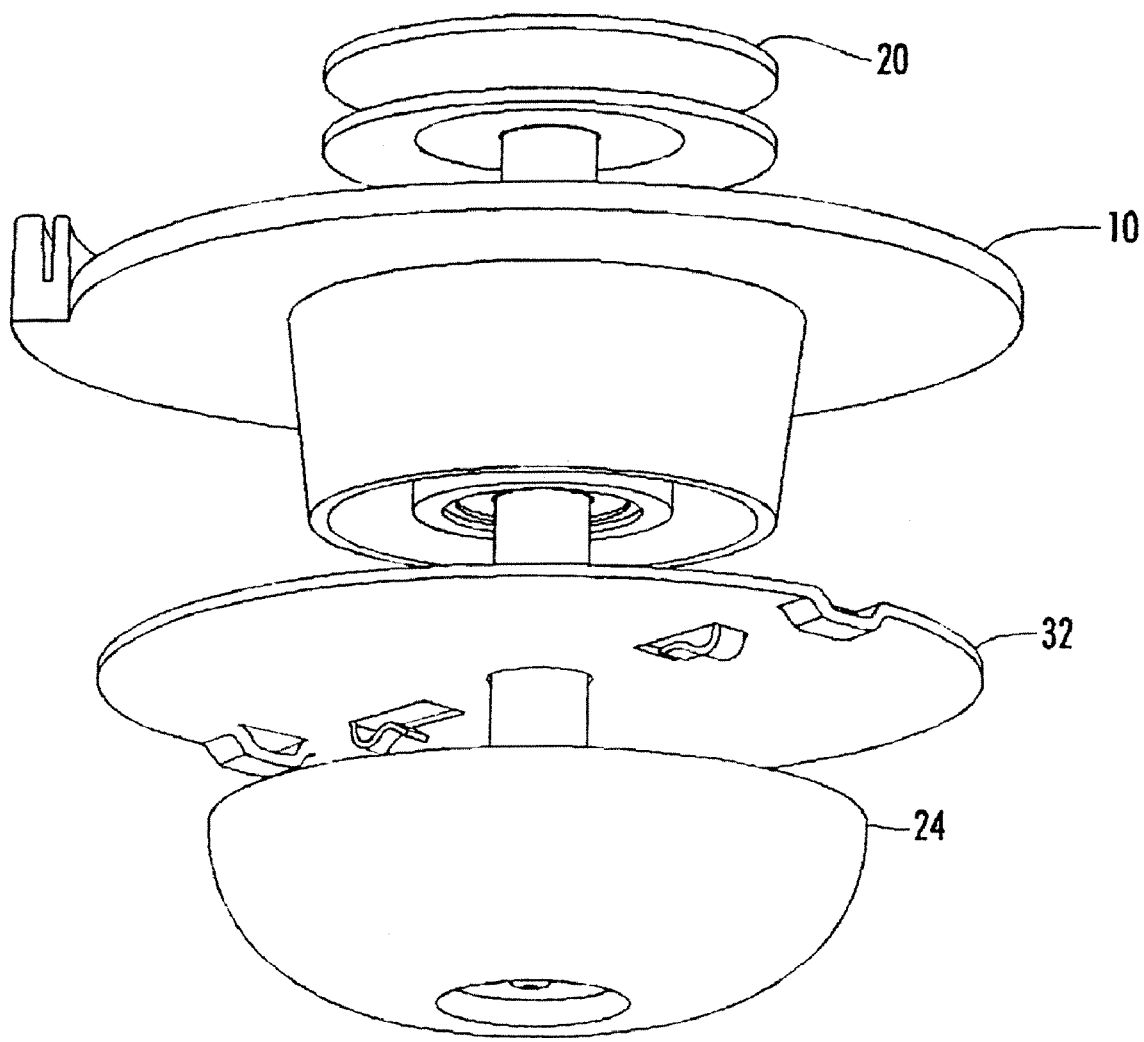
FIG. 1 is an isometric view of a first embodiment of the present invention.
Figure 2:
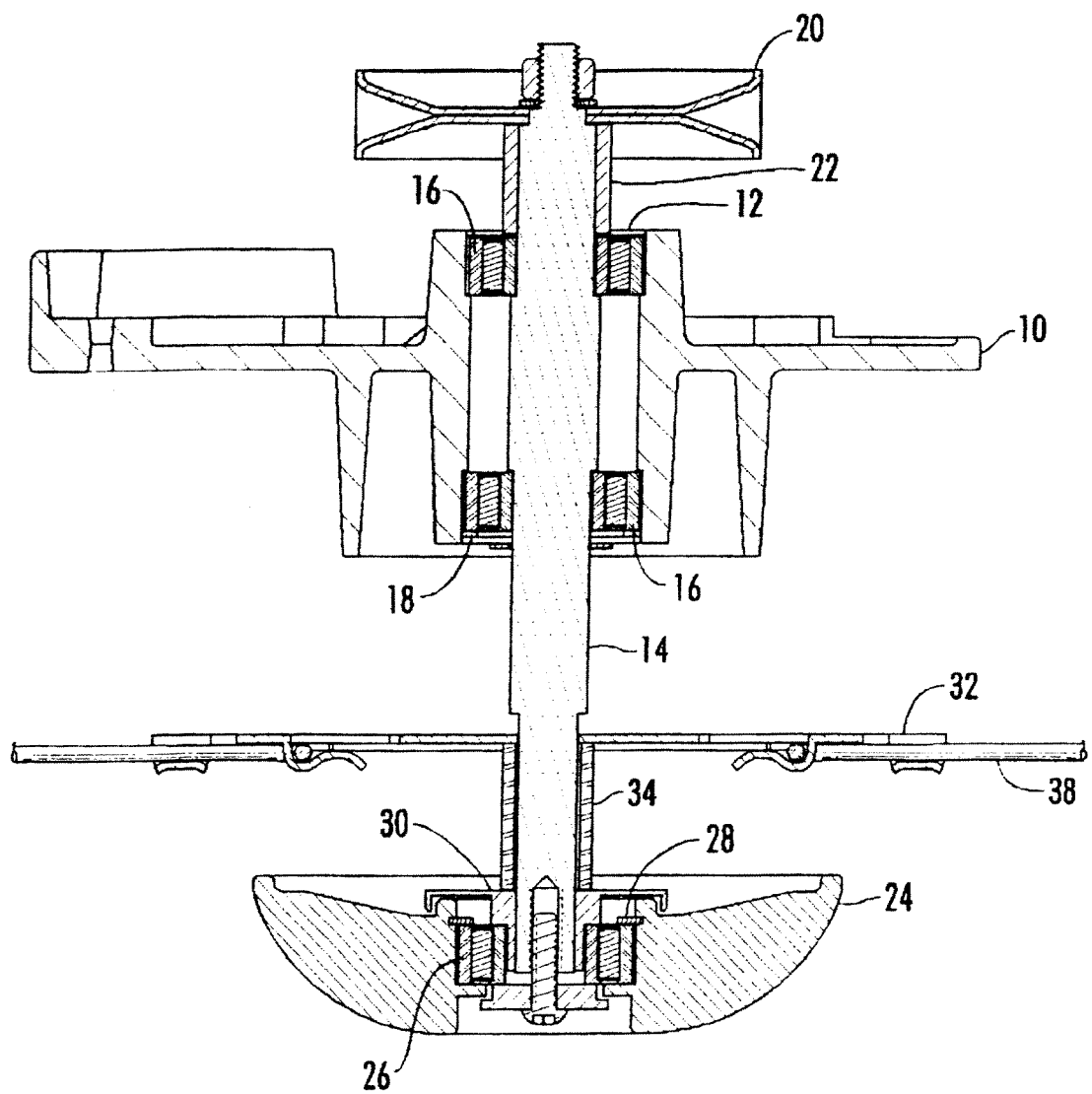
FIG. 2 is a sectional view of the first embodiment of the present invention.

Referring to FIGS. 1 and 2, a first embodiment of the present invention includes a spindle housing 10 having a circular opening 12 defined therein. The spindle housing 40 is designed to be connected to conventional wheeled lawn trimmers (not shown) and may be varied to facilitate connection to different types of wheeled lawn trimmers.

A spindle shaft 14 is rotatably coupled to the spindle housing 10 using the opening 12 and a pair of bearings 16. The bearings 16 are held in place using a bearing set collar/grip ring 18. A pulley 20 is connected to one end of the spindle shaft 14 using a lock washer and a pulley nut (not shown), and is separated from the spindle housing 10 using a pulley spacer 22.

A mow ball 24 is rotatably connected to the opposite end of the spindle shaft 14 using a bearing 26 (which is identical to the pair of bearings 16 referenced previously), a retaining ring 28, and a bearing cover 30. The retaining ring 28 holds the bearing 26 in place and the bearing cover 30 prevents dirt, grass, and other abrasive substances from contacting the bearing.

A string carrier plate 32 is connected to the spindle shaft 14 in between the spindle housing 10 and the mow bail 24. In addition, the string carrier plate 32 is separated from the mow ball 22 using a string carrier spacer 34.

Figure 3:
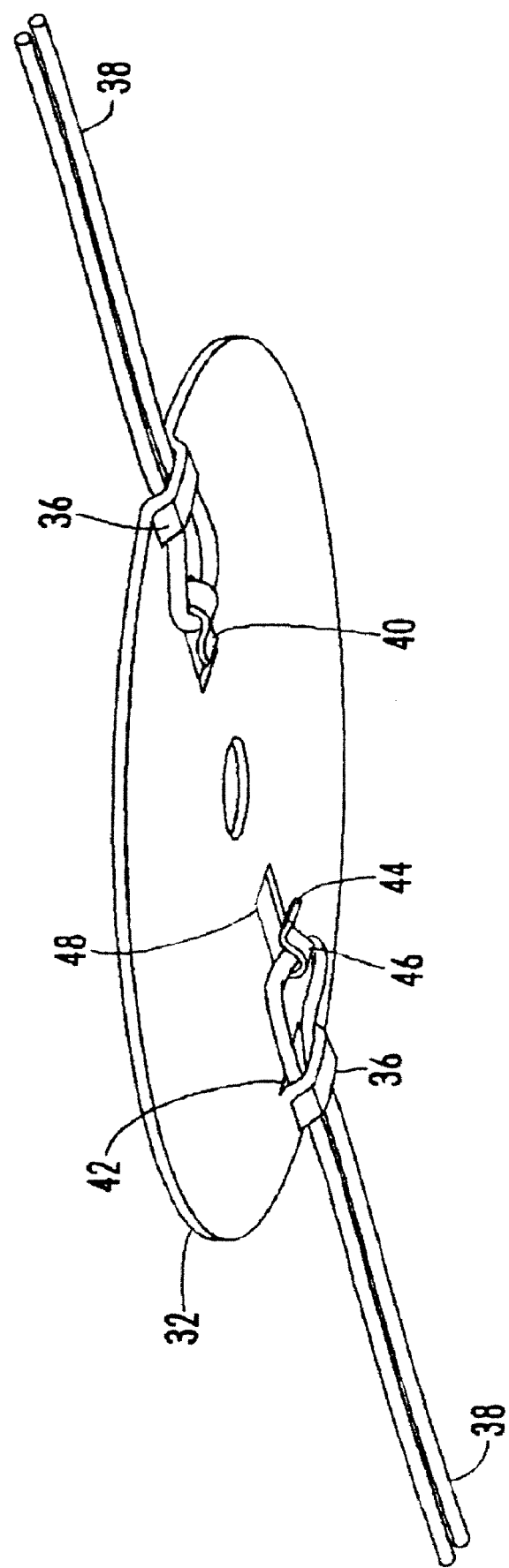
FIG. 3 is an isometric view of the string carrier plate of the first embodiment.

Referring to FIG. 3, the string carrier plate 32 includes a pair of string guides 36 for guiding cutting string 38 onto the string carrier plate 32 and a pair of s-shaped string holders 40 for securing the cutting string 38 to the string carrier plate 32. The string guides 36 include openings 42, which are designed to act as guides for the cutting-string 38. The s-shaped string holders 40 are designed to hold the cutting string 38 securely in place and include a raised lip portion 44 and a clamping portion 46. The raised lip portion 44 is biased against the underside 48 of the string carrier plate 32 and is designed to be temporarily raised to allow cutting string 38 to pass between the raised lip portion 44 and the underside 48 of the string carrier plate 32.

To secure the cutting string 38 on the string carrier plate 32, one simply folds one piece of cutting string 38 in half, forming a loop at one end. This loop is then passed through one of the string guide openings 42 and lowered down around the raised lip portion 44 of the string holder 40. Finally, the cutting string 38 is pulled against the raised lip portion 44 of the string holder 40 until the loop of the cutting string 38 slides underneath the raised lip portion 44 into the clamping portion 46. Because the raised lip portion 44 is biased against the underside 48 of the string carrier plate 32, the cutting string 38 is effectively clamped between the clamping portion 46 and the underside 48 of the string carrier plate 32.

Figure 4:
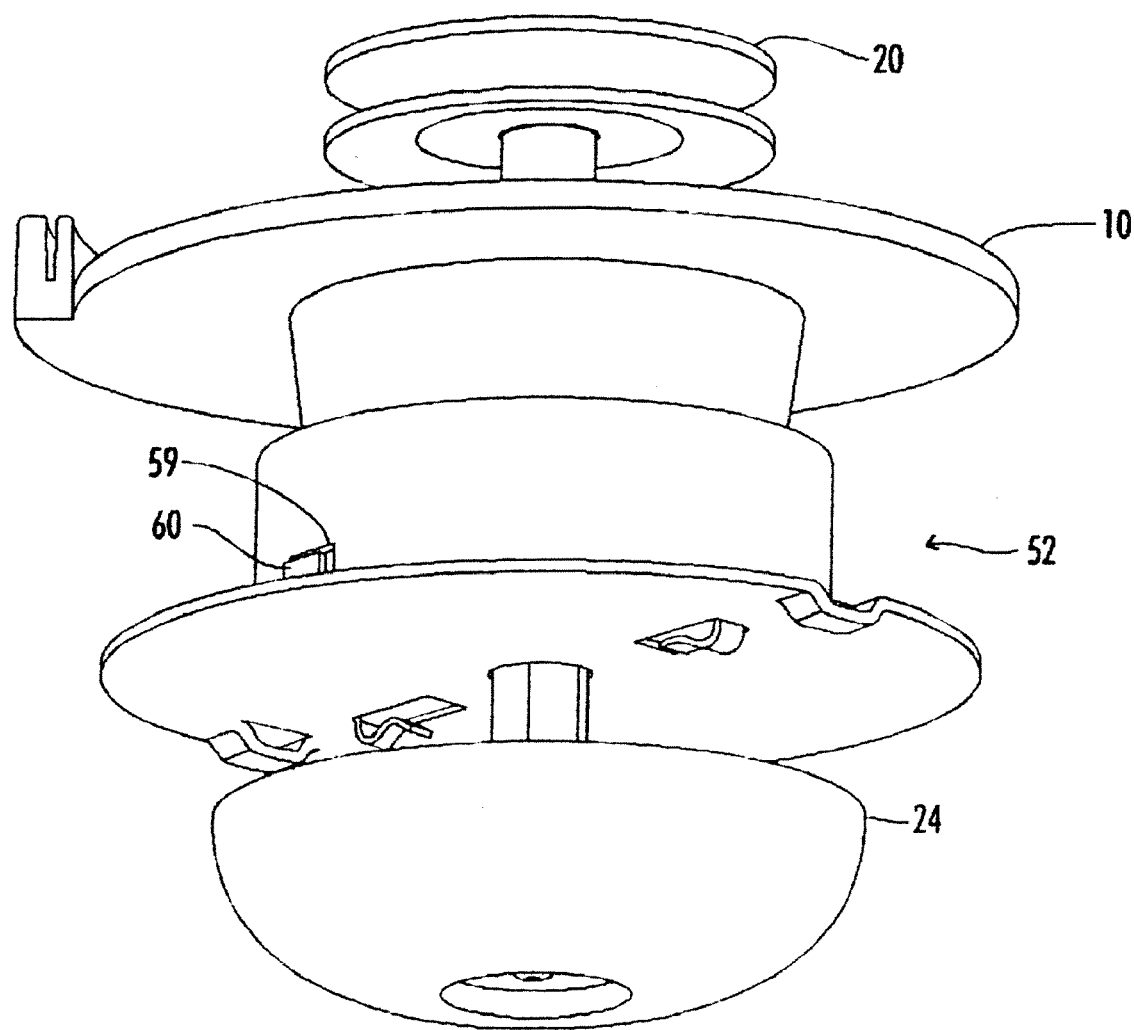
FIG. 4 is an isometric view of a second embodiment of the present invention._
Figure 5:
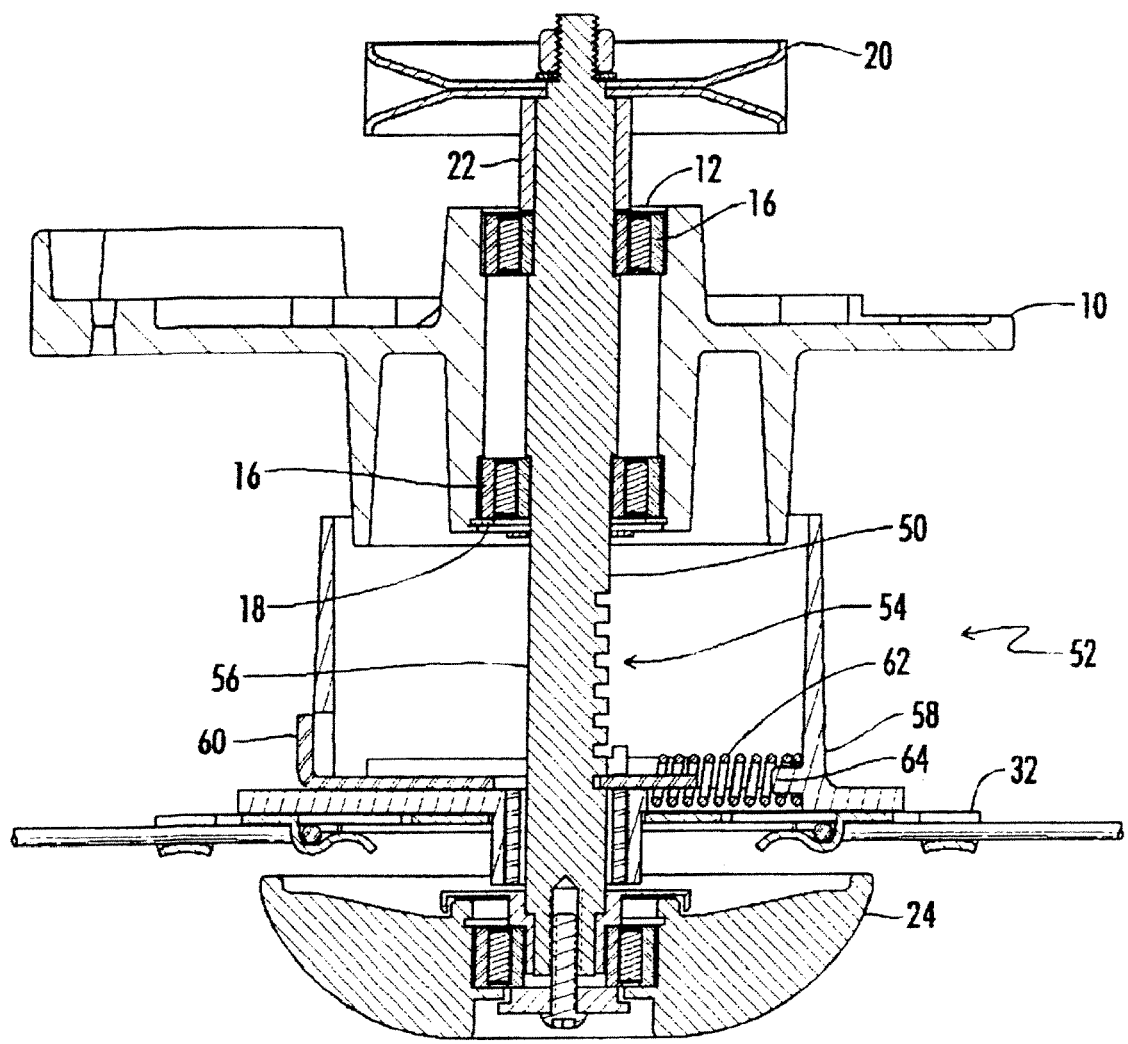
FIG. 5 is a sectional view of the second embodiment of the present invention.
Figure 6:
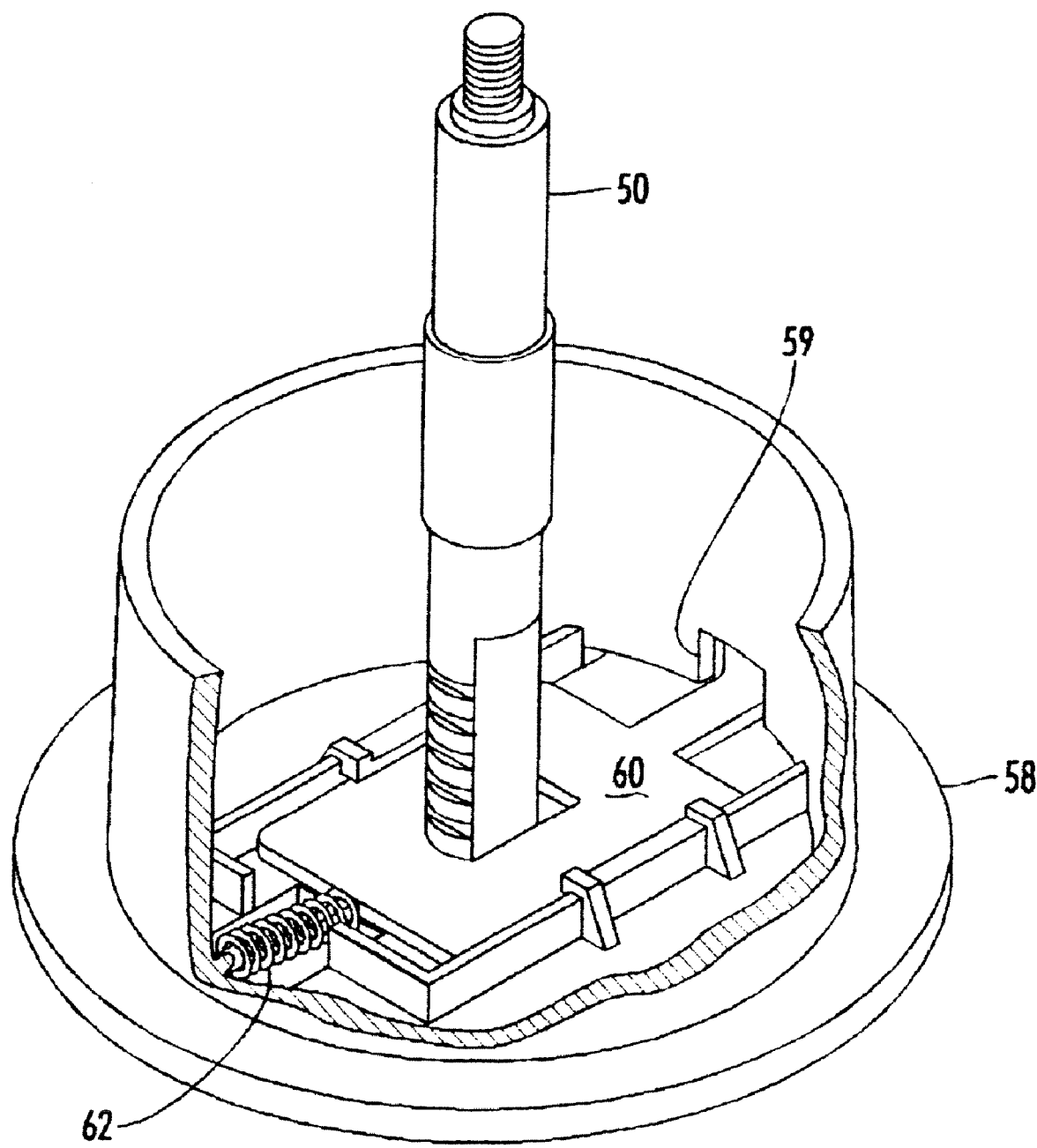
FIG. 6 is an isometric view of the adjustable string carrier assembly of the second embodiment.
Figure 7:
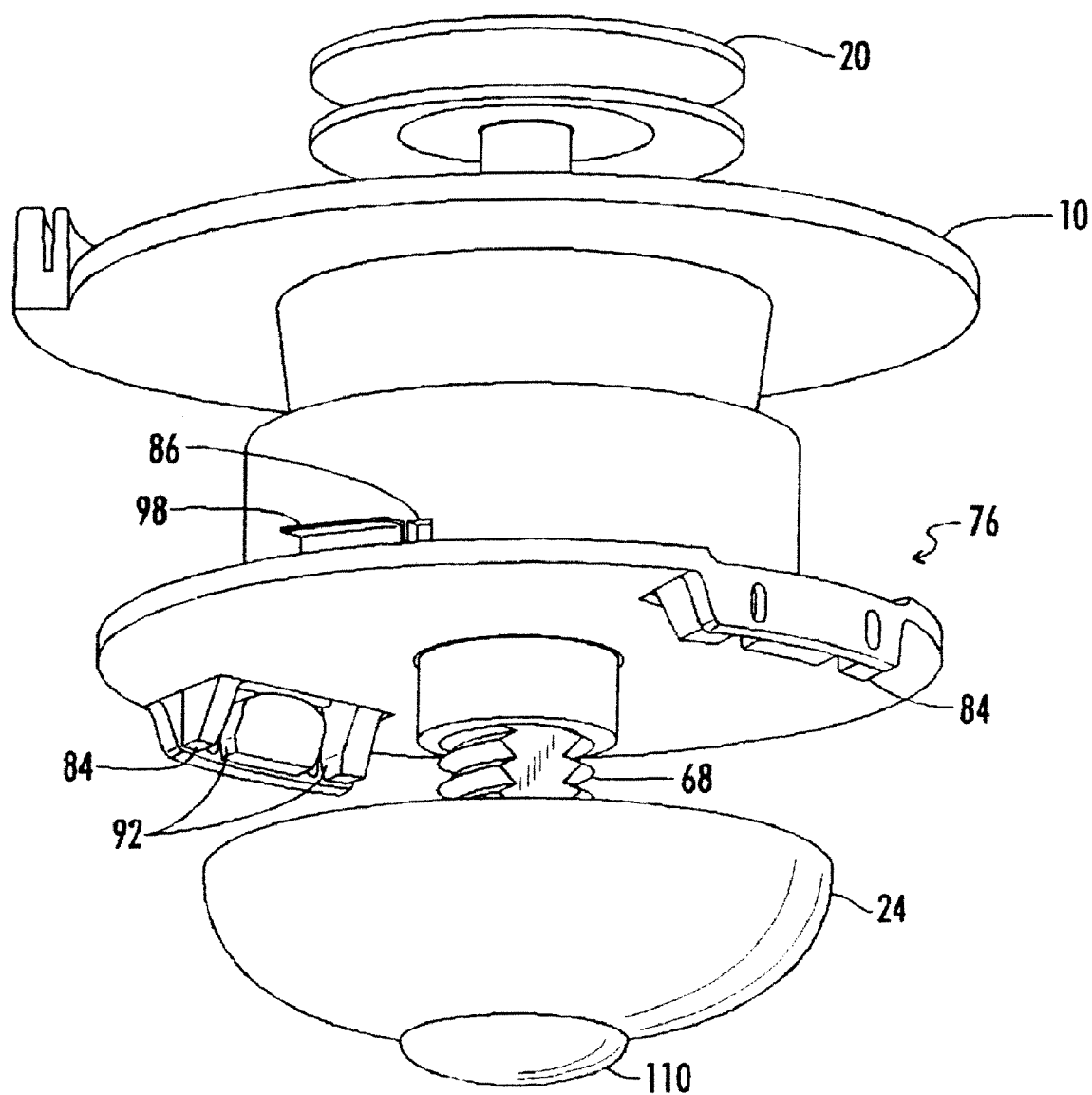
FIG. 7 is an isometric view of a third embodiment of the present invention.
Figure 8:
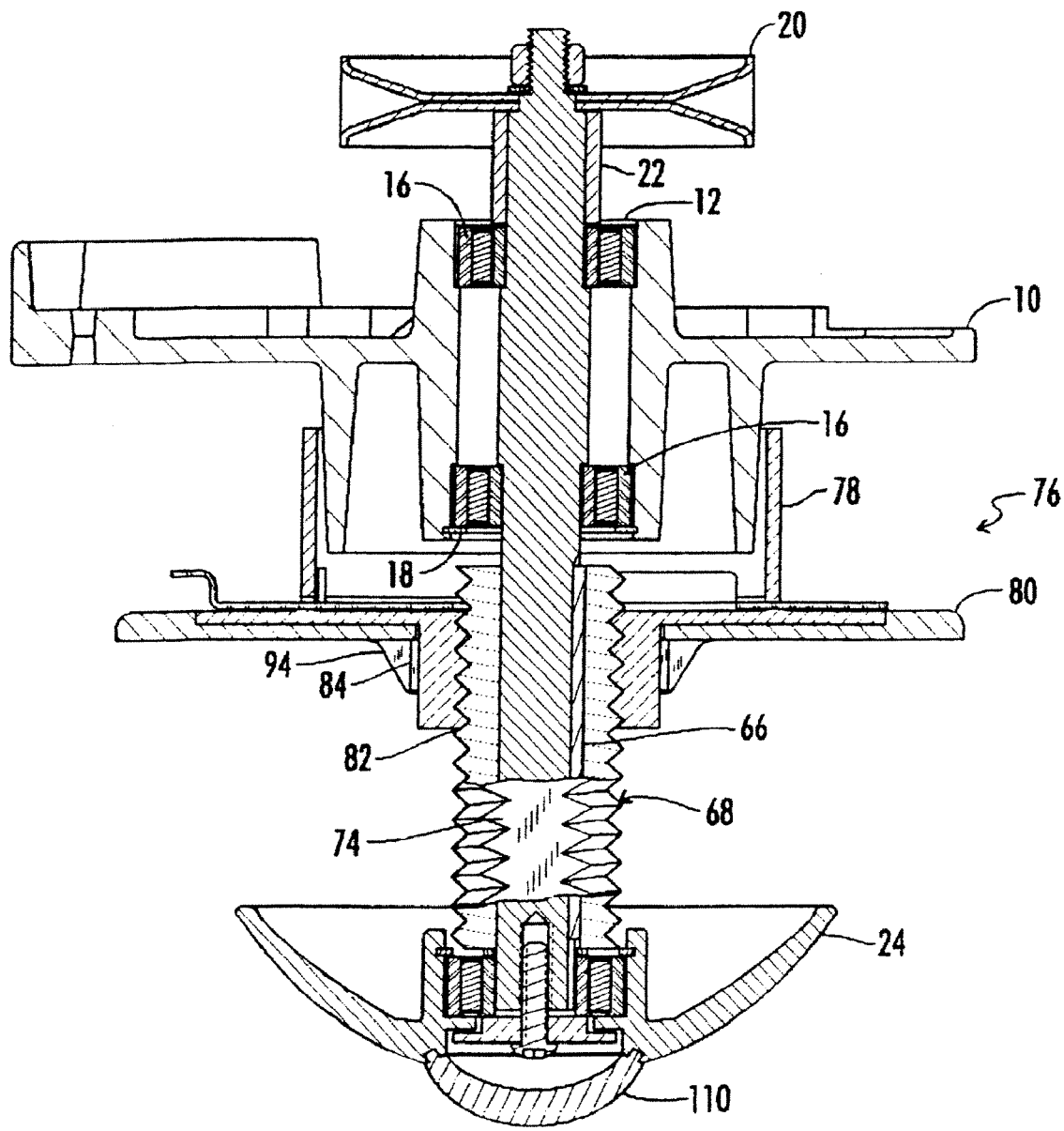
FIG. 8 is a sectional view of the third embodiment of the present invention.

Referring to FIGS. 4-6, a second embodiment of the present invention is shown that is identical to the first embodiment except for the spindle shaft 14 and the string carrier plate 32. More specifically, the second embodiment replaces the spindle shaft 14 with a grooved spindle shaft 50 and the string carrier plate 32 with an adjustable string carrier assembly 52.

The grooved spindle shaft 50 (FIG. 5) is rotatably coupled to the spindle housing 10 using a pair of bearings 16 and the opening 12. Once again, the bearings 16 are contained in the opening 12 using a bearing set collar/grip ring 18. The grooved spindle shaft 50 includes a series of rectangular-shaped locking grooves 54 along the lower portion 56 of the grooved spindle shaft 50 below the spindle housing 10.

The adjustable string carrier assembly 52 includes a mounting assembly 58 connected to the string carrier plate 32 used in the first embodiment. The mounting assembly 58 (FIG. 6) is adjustably connected to the grooved spindle shaft 50 between the mow ball 24 and the spindle housing 10 using the locking grooves 54, a locking slide 60, and a 1.5-inch compression spring 62. The 1.5-inch compression spring 62 is positioned in the mounting assembly 58 so that one end presses against an inner portion 64 of the mounting assembly 58 and the other end presses against the locking slide 60, thereby biasing the locking slide 60 into one of the locking grooves 54. By pressing against the opposite end of the locking slide 60, which extends outward from the opposite side of the mounting assembly 58 through a locking slide opening 59 (FIGS. 4 and 6), the 1.5-inch compression spring 62 is compressed and the locking slide 60 is disengaged from the locking grooves 54. As a result, the mounting assembly 58 may be adjusted upward toward the spindle housing 10 or downward toward the mow ball 24.

Referring to FIGS. 7-10, a third embodiment of the present invention is shown. This embodiment includes a spindle housing 10 having an opening 12 and a mow ball 24 as shown in the first and second embodiments. A keyed spindle shaft 66 (FIG. 8) is rotatably connected to the spindle housing 10 using the opening 12 and a pair of bearings 16. As was the case with the first and second embodiments, the bearings 16 are held in place using a bearing set collar/grip ring 18. In a similar manner, a pulley 20 is connected to one end of the keyed spindle shaft 66 using a lock washer and a pulley nut (not shown), and is separated from the spindle housing 10 using a pulley spacer 22.

This embodiment also includes a height adjustment tube 68 (FIG. 9) that is connected to the mow ball 24, and includes a keyed inner portion 70 and an exterior threaded portion 72. The keyed inner portion 70 matches the keyed spindle shaft 66 and allows the keyed spindle shaft 66 to be inserted into the height adjustment tube 68. Furthermore, because the keyed spindle shaft 66 and the keyed inner portion 70 are mated together when the keyed spindle shaft 66 is inserted into the height adjustment tube 68, the keyed spindle shaft 66 and the height adjustment tube 68 rotate together when the keyed spindle shaft 66 is rotated. The exterior threaded portion 72 includes flat locking portions 74 on opposite sides and along the length of the height adjustment tube 68.

Figure 9:
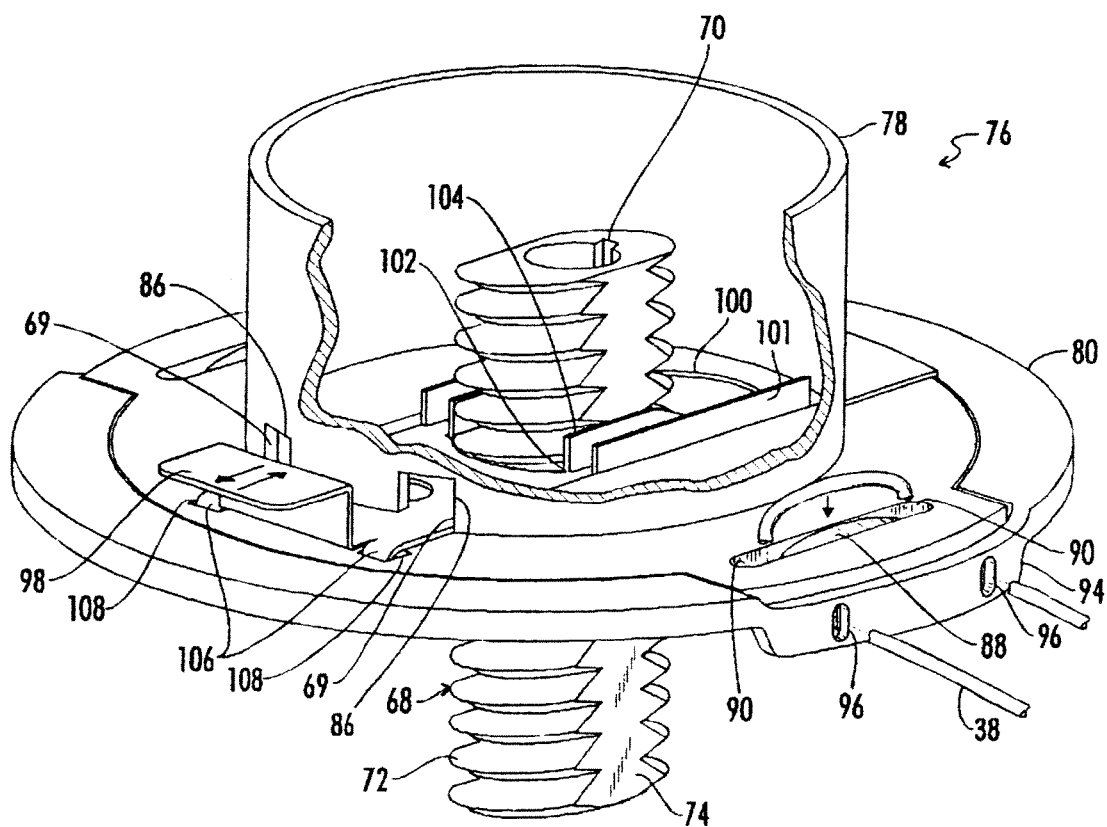
FIG. 9 is an isometric view of the string cutting assembly of the third embodiment.

The third embodiment further includes a string cutting assembly 76 that includes a string mount 78 and a cutting disk 80. The string mount 78 includes a threaded opening 82, a pair of triangular-shaped string holders 84 (FIG. 7), and a locking plate opening 86 (FIG. 9). The threaded opening 82 is threaded onto the height adjustment tube 68 and the string mount 78 can be moved upward and downward by rotating the threaded opening 82 with respect to the height adjustment tube 68. A pair of locking plate guides 69 (FIG. 9) are positioned on both sides of the locking plate opening 86 inside the string mount 78 and are used to guide the locking plate 98 when it is moved back and forth within the locking plate opening 86.

The triangular-shaped string holders 84 (FIG. 7) include a string holding groove 88 (FIG. 9) connected between two string openings 90 and located on an upper portion of the triangular-shaped string holders 84. The triangular-shaped string holders 84 also include a pair of v-shaped string holding portions 92 located on a lower portion of the triangular-shaped string holders 84.

The cutting disk 80 is connected to the string mount 78 and includes a pair of tabs 94 (FIG. 9) that are aligned with the triangular-shaped string holders 84. In addition, the tabs 94 include a pair of oval openings 96 that are aligned with the v-shaped string holding portions 92. In use, the cutting string 38 is passed through the string openings 90 into the string holding groove 88, and each end of the cutting string 38 is passed through the oval openings 96 and secured into the v-shaped holding portions 92.

Figure 10:
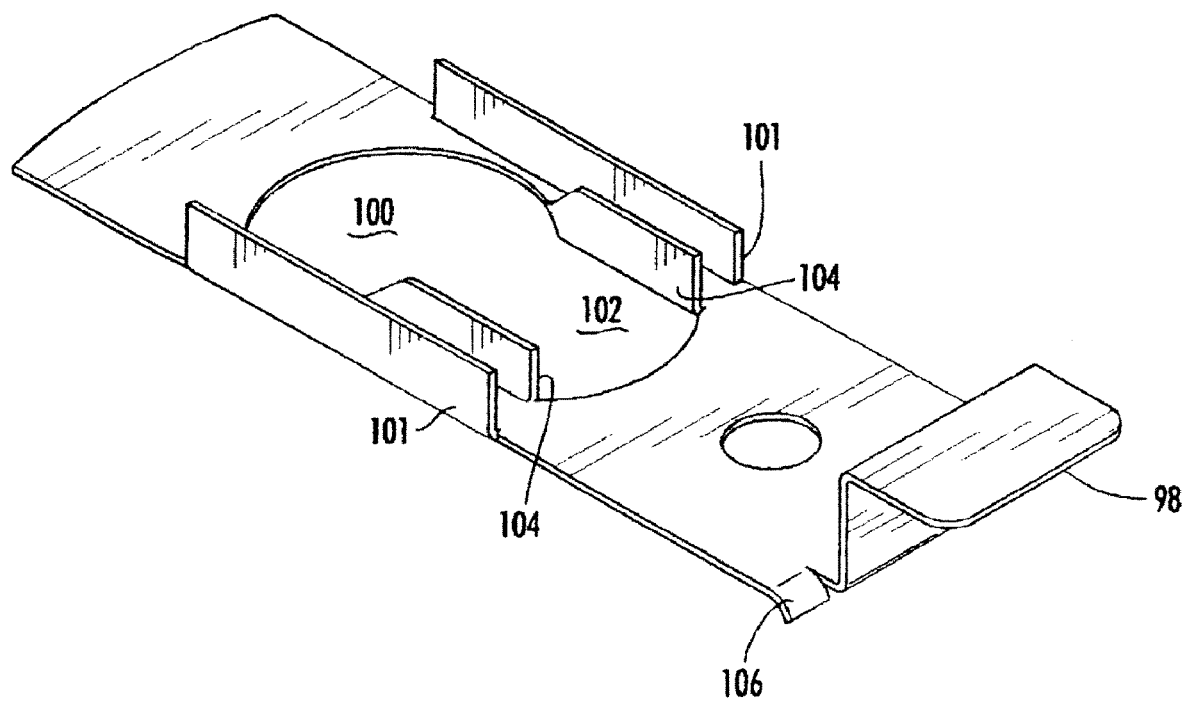
FIG. 10 is an isometric view of the locking plate of the third embodiment.

The string cutting assembly 76 is secured in place along the height adjustment tube 68 using a locking plate 98 (FIG. 10) and the flat locking portions 74 of the height adjustment tube 68. The locking plate 98 includes a circular opening 100 for receiving the exterior threaded portion 72 of the height adjustment tube 68 and a rectangular-shaped opening 102 for receiving the flat locking portions 70 of the height adjustment tube 68. In addition, rectangular-shaped opening 102 is flanked by a pair of locking tabs 104 (FIG. 9) designed to be pressed against the flat locking portions 74 of the height adjustment tube 68 in order to lock the string cutting assembly 76 in place with respect to the height adjustment tube 68. Finally, the locking plate 98 also includes a pair of guide tabs 101 (FIG. 9) and a pair of locking flaps 106 (FIGS. 9 and 10). The guide tabs 101 are used with the locking plate guides 69 to guide the locking plate 98 when it is moved back and forth within the locking plate opening 86. The locking flaps 106 are positioned in a pair of rectangular openings 108 (FIG. 9) in the string mount 78 in order to restrict the movement of the locking plate 98 into and out of the locking plate opening 86.

To adjust the height of the string cutting assembly 76, the locking plate 98 is moved until the circular opening 100 is aligned with the exterior threaded portion 72. In this arrangement, the string mount 78 is unlocked and can be rotated with respect to the height adjustment tube 68, causing the string cutting assembly 76 to move up or down along the height adjustment tube 68. Once the string mount 78 is moved to a desired location, the locking plate 98 is moved until the rectangular-shaped opening 102 is aligned with the flat locking portions 74 of the height adjustment tube 68. As a result, the string mount 78 is locked and cannot be rotated with respect to the height adjustment tube 68.

Finally, in all three of the embodiments discussed above, a replaceable wear point 110 (FIGS. 7 and 8) may be connected to a lower portion of the mow ball 24 to further reduce wear on the mow ball 24. As such, the wear point 110 may be made of plastic or some other suitable type of material and is designed to snap into the mow ball 24.

Thus, it should be understood that the embodiments and examples have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art. Accordingly, it is intended that the scope of the invention be defined by the claims appended hereto.

I claim:

1. An adjustable spindle assembly, comprising:
a spindle housing;
a keyed spindle shaft rotatably coupled to the spindle housing;
a mow ball rotatably connected to one end of the keyed spindle shaft;
a height adjustment tube connected to the mow ball and adapted to receive the keyed spindle shaft; and
a string cutting assembly adjustably connected to the height adjustment tube and adapted to be fixed at various positions along the height adjustment tube, said string cutting assembly comprising a string mount and a cutting disk, said string mount comprising a pair of string holders for securing cutting string to the string mount, wherein the string holders are provided with v-shaped openings for holding the cutting string,
further wherein the string mount is provided with a threaded opening and the height adjustment tube includes an exteriorly threaded surface adapted to be threaded into the threaded opening, and
further wherein the string mount includes a locking plate for securing the string cutting assembly at various positions along the length of the height adjustment tube.

2. The spindle assembly of claim 1, wherein the height adjustment tube includes a flat locking portion along the length of the height adjustment tube and the locking plate is provided with a rectangular-shaped opening for engaging the flat locking portion, thereby fixing the string mount in place.

3. The spindle assembly of claim 1, further comprising a pulley connected to a second end of the spindle shaft.

4. The spindle assembly of claim 1, further comprising a wear point removably connected to the mow ball.

* * * * *